Figure 1:
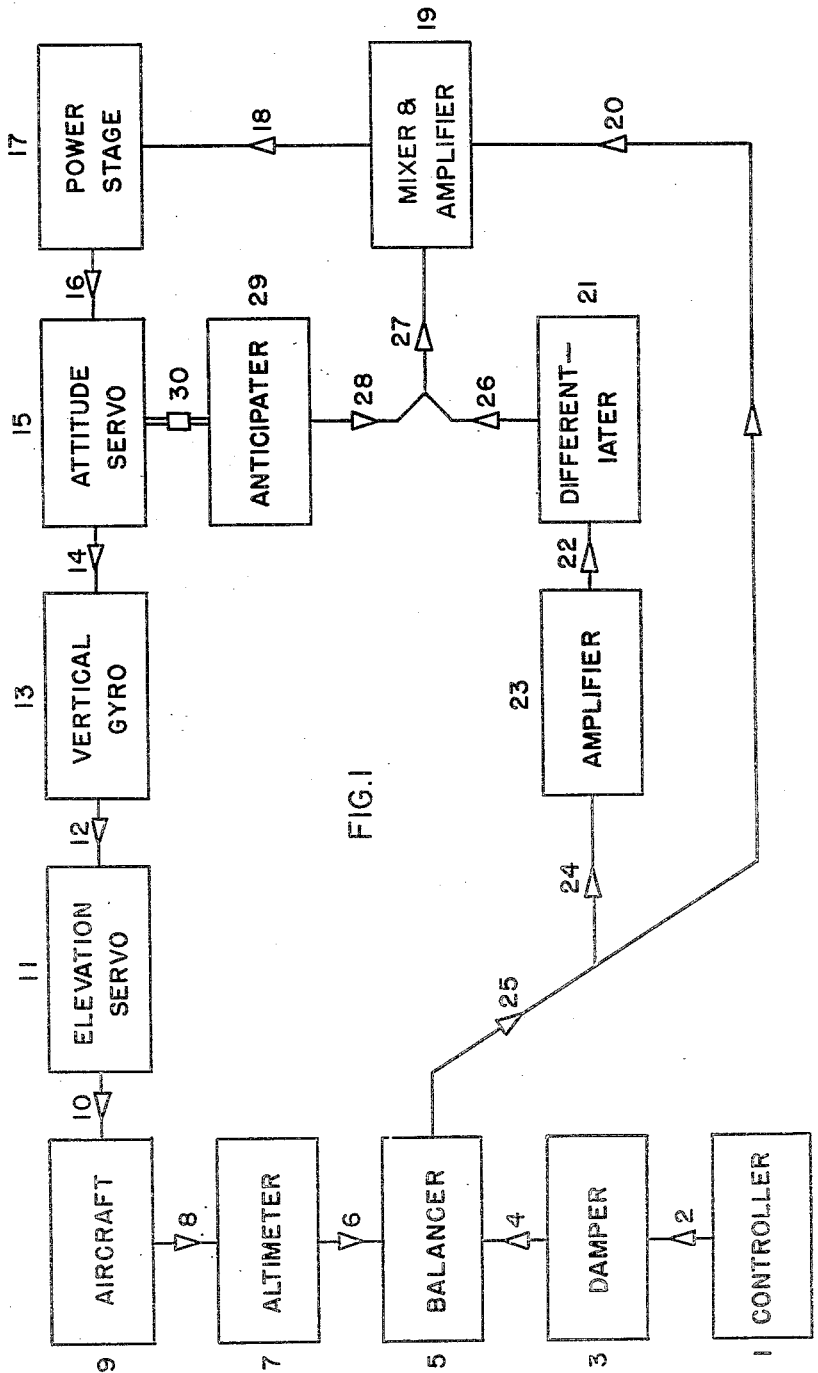

May 9, 1950 R. HOFSTADTER 2,507,304
ALTITUDE CONTROL FOR AIRCRAFT
Filed July 25, 1944 2 Sheets-Sheet 2

INVENTOR
ROBERT HOFSTADTER
BY
Sawyer & Kennedy
ATTORNEYS

Patented May 9, 1950

2,507,304

UNITED STATES PATENT OFFICE 2,507,304

ALTITUDE CONTROL FOR AIRCRAFT

Robert Hofstadter, New York, N. Y., assignor to The Norden Laboratories Corporation, New York, N. Y., a corporation of New York Application July 25, 1944, Serial No. 546,553

13 Claims. (Cl. 318—481)

1

This invention relates to automatic altitude control for aircraft.

Altitude control of aircraft may involve the maintenance of level flight, or the controlled change of altitude of flight, or both.

An automatic altitude control device, taken together with the aircraft, constitutes a relatively complex mechanical system in which the aircraft response to the flight control device may affect the device itself, with a time lag depending upon the characteristics of the system as a whole, and may produce, depending on conditions, either a sustained oscillation of the aircraft about an altitude or set flight path, a damped oscillation or movements of various other types.

In typical automatic altitude control systems as hitherto known, the altitude is controlled in response to an altimeter, the output energy or signal of which is balanced against a selected portion of a source of energy or signal corresponding to selected flight altitude, so as to produce a control signal representing the displacement from desired altitude position of the aircraft. Such signal may take the form of an electrical or mechanical response, as for example, a given voltage or mechanical displacement. In addition a signal representing vertical velocity, or related thereto, may be taken into account, as, for example, a signal representing aircraft angle of attack or elevator angle. In response to the control signal or signals the altitude control system then produces a theoretically required alteration of the aircraft elevator position. The vertical movement and position of the aircraft are not, however, determinable by elevator position alone, but depend also upon the load, trim and air speed, so that such known systems require constant adjustment in view of changing load, trim and air speed. In consequence, unless the relationship between elevator setting as determined by the flight control device happens to correspond accurately to the setting required by all factors of load, trim and air speed the system will be of an oscillatory character, involving a continual change of altitude, or will stabilize for flight at an incorrect altitude. Secondly, in known systems, the lag of the aircraft in responding to the control device tends to produce overrun, which in turn makes the characteristic operation of the device, where relatively satisfactory, a damped oscillation and where relatively unsatisfactory, a sustained oscillation. A third characteristic of many known systems is that the aircraft in its return or approach to set level tends to enter the inactive zone, or zone within which the altitude deviation is insufficient

2 to actuate the flight control system, with a velocity sufficient to carry it through such zone, again causing overrun.

Where altitude is regulated otherwise than by adjustment of elevator position, as, for example, when the air speed is regulated, the same difficulties are present, for the reason that the system determines merely a flight characteristic rather than actual altitude or velocity.

It is the general object of the present invention to provide a flight control device which is capable of eliminating these defects.

Many of the defects, above referred to, result from attempted altitude control by adjusting the aircraft elevator to various positions supposedly corresponding to indicated altitude deviations or to indicated altitude deviations and velocity indications. The function of the control surfaces, however, is to produce a velocity of movement, whether vertical or angular, and the actual velocity produced depends not only on the control surface setting but also upon other factors, as mentioned above. An object of the present invention, therefore, is to control the actual velocity, rather than merely the control surface position. For example, where conventional altitude control is utilized a change of load, due to fuel consumption or other reason, will render elevator setting no longer correct and the aircraft will not fly at the desired level. The system of the present invention will, however, automatically compensate for such change of load by suitable readjustment of the aircraft attitude.

A further object of the invention is to provide for anticipation of the aircraft response to action of the control system, by which overrun is prevented. Such anticipation likewise relates the control system properly to the aircraft in point of time and results in improved possibilities of velocity control.

A further object of the invention is to provide for control of an aircraft in response to both altitude and rate of change of altitude so that desirable characteristics of response to any factor causing altitude deviation are obtained and the return or approach to desired altitude may be controlled so as to avoid overrun.

Still another object of the invention is to provide improved means for controlling change of altitude of an aircraft from one set altitude to another.

With these and other objects which will appear in the following full description in mind, the invention consists in the combinations and arrangements of parts and details of construction which will now first be fully described in connection with the accompanying drawing and then pointed out more particularly in the appended claims.

Figure 2:
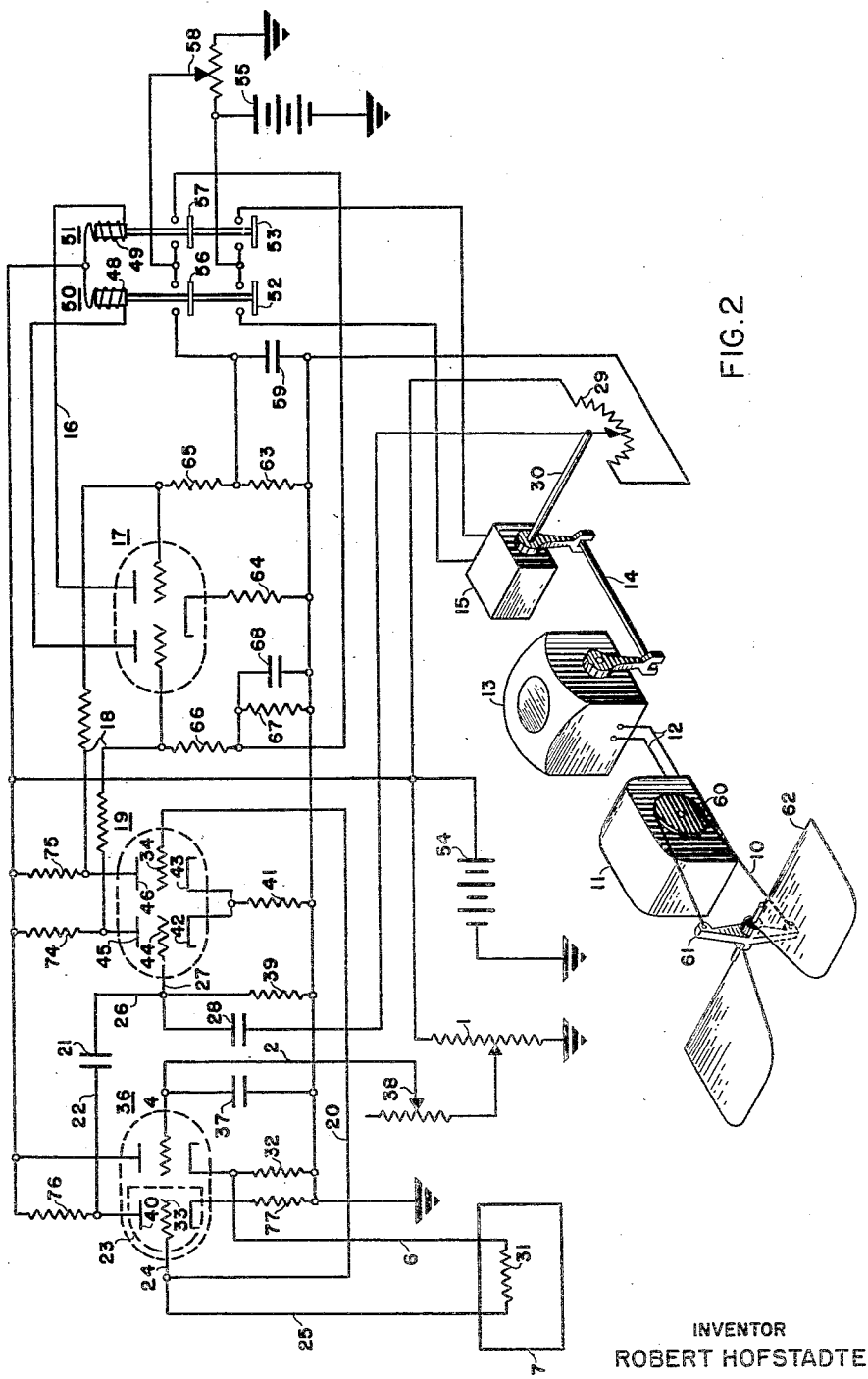

In the drawing:

Figure 1 is a schematic diagram exhibiting in generalized or abstract form the elements involved in the control system of the invention and their interrelationships; and Figure 2 is a circuit diagram of a device embodying the invention in a preferred embodiment.

For clarity of explanation, the operation of the control system will first be explained with relation to the schematic diagram, and thereafter the specific embodiment of Figure 2 will be described in detail.

Referring now to Figure 1, the automatic flight control system comprises the balancer 5, responsive to altitude set by the controller 1, through channel 2, into damper 3 and thus into balancer 5, and also responsive through channel 6 to altimeter 7, which in turn responds to the position of the aircraft 9, the relation being indicated symbolically by the channel 8. So much of the device, apart from the damper 3, is old in itself, and the altimeter 7 may be of any convenient type, whether responsive to atmospheric pressure or to distance from the surface of the ground or sea. The balancer signal is communicated through channel 25 to the remaining elements of the control device which in turn serve to operate the aircraft automatic pilot mechanism, comprising vertical gyroscope 13 and elevation servomotor 11, by means of which the elevator of aircraft 9 is controlled. The various "channels" indicated in the diagram may, as will now be evident, indicate either electrical circuit connections, mechanical connections or other apparatus causing response of one element to another.

The balancer signal, representing the difference $(h_1-h)$ between set altitude $h_1$ of controller 1 and actual altitude $h$ as indicated by the altimeter 7, is communicated through channels 25 and 24 to amplifier 23 and therefrom, through channel 22 to differentiator 21, which produces a signal representing rate of change of altitude deviation $$k\frac{d(h-h_1)}{dt}$$

or, when the set altitude $h_1$ is fixed, representing $$k\frac{dh}{dt}$$

the symbol $k$ in either instance representing a proportionality constant determined by the characteristics of the elements, and $$\frac{dh}{dt}$$

being a vertical velocity. This signal is communicated through channels 26 and 27 to the mixer and amplifier 19, and is passed through channel 18 to the power stage 17, the output of which serves through channel 16 to operate the attitude servomotor 15 and thus to operate the aircraft automatic pilot 13, to control the elevator position. In this way the control system produces elevator adjustments opposing any increase of vertical velocity, whether climb or glide, and tending to bring the vertical velocity to zero.

As so far described, the system will, however, respond, not to the vertical velocity to be produced by an adjustment of the control surfaces but rather to the pre-existing vertical velocity, so that the vertical velocity signal communicated to the mixer and amplifier 27 will lag behind that produced by the adjustment by a time interval determined by the lag of the automatic pilot in setting the elevator and the lag of the aircraft in responding to change of setting. Such lag tends to produce overrun and a condition of more or less damped oscillation or "hunting" of the aircraft. This condition is corrected by feeding back from the attitude servomotor 15 by means of channel 30, anticipator 29 and channels 28 and 27, an anticipator vertical velocity signal component which represents the signal related to a change to be expected after the adjustment has taken effect and produced response of the altimeter 7. The anticipator signal is produced so long as the adjustment of control surfaces in a given direction is taking place, so that the signal introduced into the mixer and amplifier 19 represents the vertical velocity which the aircraft will have after each increment of adjustment has taken effect, and the anticipator signal thereafter decays with a time constant suitably related to the lag, so that when adjustment in a given direction is completed and the anticipator signal has decayed to an ineffective value, the signal introduced into the mixer and amplifier 19 will again correspond to the actual simultaneous aircraft vertical velocity.

As so far described, the system will control the vertical movement of the aircraft, but will not return the aircraft to a given altitude when displaced therefrom. In order to provide for maintenance of set altitude, the altitude deviation signal or indication, $h_1-h$, is likewise communicated to the mixer and amplifier 19, through channels 25 and 20 and is there combined with the vertical velocity signal or indication to produce a signal S proportional to the difference $$(h_1-h)-k\frac{dh}{dt}$$

In view of the organization of the elements of the control system it is not necessary that proportionality be maintained, but merely that the signal S produced by the mixer be zero when the above difference is zero and increase and decrease suitably therewith over a desired operating range.

The signal S is communicated to power stage 17 through channel 18 and serves to control the attitude servomotor 15 and thus to control the aircraft automatic pilot, this control operating to adjust the elevator toward increased climb or decreased glide in response to a positive signal and to adjust the elevator for increased glide or decreased climb in response to a negative signal. The result of such adjustments is the control of the aircraft flight so as to make the signal S equal to zero, and the aircraft flight accordingly will follow the equation:

$$(h_1-h)-k\frac{dh}{dt}=0 \qquad (1)$$

approximating thereto to a degree determined by the sensitivity of the control system and the residual effects of any uncompensated or overcompensated lag. There will in any case be an inactive zone for the control system, in which the signal S is insufficient to initiate a response, and accordingly the aircraft will maintain flight within a distance above or below the set altitude determined by the characteristics of the system. The system of the invention provides wide adaptability in this respect, the inactive zone being determined by the sensitivity of attitude servomotor 15 in relation to the output of power stage 17.

Too great sensitivity causes a large number of unnecessary adjustments, and thus produces undue wear of the automatic pilot, and also produces too rigid a flight with consequent strain on the aircraft. In addition, when an altimeter responsive to height above ground surface is utilized, too great sensitivity will produce irregular flight due to the aircraft responding to minor changes of terrain. For these reasons, an inactive zone extending a few feet above and below the set altitude will normally be provided for.

As shown by the above equation, when the actual altitude $h$ is less than the set altitude $h_1$, the system provides for upward adjustment of the aircraft elevator in response to increased altitude deviation and downward adjustment in response to increased upward vertical velocity. When the indicated altitude $h$ exceeds the set altitude $h_1$, the altitude deviation signal changes sign and a downward adjustment of the aircraft elevator will be produced in response to increased altitude deviation and an upward adjustment in response to increased downward velocity. Thus, in all cases the effect of increased altitude deviation is to increase elevator adjustment in a direction to return the aircraft to set altitude and the effect of increased vertical velocity in the direction of return to set altitude is to decrease the elevator adjustment in the return direction.

It is to be noted, however, that there is no predetermined or known relationship between control surface setting, or any other single flight characteristic, and the control system signal. Thus, the elevator adjustment is utilized merely as an intermediate variable, being influenced by the control system and in turn, through aircraft response, influencing the same. The law of flight which results, however, involves only the vertical velocity, altitude and time, and these are inter-related properly without taking elevator adjustment explicitly into account.

It should be further noted that the vertical velocity is itself directly or explicitly controlled. For example, if it be assumed that the aircraft is climbing or gliding but happens to be at the set altitude, the control system will nevertheless respond to the indicated vertical velocity of climb or glide, making an adjustment tending to reduce the same to zero, and will thus initiate adjustment to correct the vertical velocity even though at that instant there may be no altitude deviation.

Where an altitude deviation is imposed upon the aircraft, as by an upward or downward gust of wind (or, by variation in terrain, where an altimeter measuring height above ground surface is employed) both the instantaneous altitude deviation caused thereby and a vertical velocity caused thereby will be indicated. As will be noted from Equation 1 the altitude deviation component and the vertical velocity component are now additive in their effect, so that a signal to which the attitude servomotor 15 responds may be produced when the altitude deviation $h_1-h$ is not yet sufficient to initiate a response. In this way, the system will function rapidly to oppose change of altitude and will ultimately arrest the change, producing a zero vertical velocity. Thereafter, if the aircraft is outside the inactive zone, return movement will be caused, the law governing which is obtained by integrating Equation 1, as follows:

$$h_1-h=(h_1-h_0)e^{-t/k} \qquad (2)$$

in which equation, the symbol $h_0$ represents the altitude at the instant that the movement is arrested and the time lapse $t$ is counted from that instant. As is apparent, the altitude deviation decreases exponentially, causing a smooth asymptotic return of the aircraft to set level $h_1$, so that overrun and hunting are effectively prevented. The return is completed when the aircraft enters the inactive zone, any altitude deviation being then insufficient to initiate response.

From Equations 1 and 2 the vertical velocity may be derived $$v=\frac{dh}{dt}=\frac{(h_1-h_0)}{k}e^{-t/k} \qquad (3)$$

showing that the vertical velocity of return also decreases exponentially.

As will now be clear, the system responds to altitude and vertical velocity, and controls vertical velocity, rather than control surface setting. In consequence, variation in load, trim or forward speed do not affect the operation, which stabilizes flight at the set altitude and controls vertical velocity of return independently of these factors. The time constant $k$, which determines the velocity, is determined by the characteristics and inter-relation of the elements of the system in a manner described below.

Where a further disturbance is encountered during return of the aircraft to set level the vertical velocity will be altered and, as is apparent from Equation 1 such alteration will be opposed in the same manner as disturbance of level flight is opposed, the system restoring the aircraft to flight according to the law of Equations 2 and 3, although with possible modification in the altitude component $h_0$ and time interval $t$ of those equations.

The control system provides also for controlled change of altitude, damper 3 being utilized for this purpose, but discussion of this phase of the invention will be postponed, for better understanding, until after description of the embodiment shown in Figure 2.

Referring now to Figure 2, element 7 is the altimeter of any desired type which provides in the output 31 a voltage proportional to the altitude. Such an altimeter, e. g., is that described in Civil Aeronautics Bulletin No. 29 at pages 86 to 90. Inasmuch as the specific form of altimeter forms no part of the present invention, this element is shown only diagrammatically. As has been mentioned, either an altimeter responsive to altitude above the ground surface or sea surface, or an altimeter responsive to barometric height may be employed, depending on service conditions.

The voltage developed by the altimeter and appearing across resistance 31 is combined with the voltage drop across resistance 32, in series with resistance 31, to influence the grids 33 and 34 of tubes 36 and 19. The voltage drop across resistance 32 reproduces the voltage across condenser 37 preset by the controller 1, by virtue of the action of the right half of tube 36 which behaves as a cathode follower, and represents the set altitude. Resistance 31 is so connected that the voltage developed opposes that developed across resistance 32, and in consequence the signal voltage applied to grids 33 and 34 will be proportional to the difference between the set altitude and actual altitude, the resistances 31 and 32 forming the balancer 5 previously referred to. The elements 37 and 38, a condenser and rheostat respectively, act as the damper 3 and furnish the time constant c, discussed below, for ascent or descent.

The signal voltage from the balancer resistors 31 and 32 follows paths 25 and 20 to the mixer and amplifier tube 19 and also follows path 24 to the amplifier half, 23, of tube 36. The amplified signal developed across the output of the amplifier 23 is applied through path 22 to the condenser 21, which serves as the differentiating element, and to the resistor 39, the voltage across the resistance 39 being the time derivative of the applied voltage except for relaxation of the condenser-resistance circuit. Cathode resistor 77, separate from resistor 32, is employed for the amplifier half 23 of the tube 36.

The mixer tube 19 is a double triode vacuum tube employing a common cathode resistor 41 connected to the cathodes 42 and 43. Voltages proportional to the difference the two signals applied to the grids 44 and 34 appear across the output circuits of the vacuum tubes 19 which are applied to the power stage 17, through the two paths 18. Since the voltage applied to grid 44 represents the vertical velocity, and that applied to grid 34 represents the altitude difference, and tubes 19 have a common cathode resistor the respective output signals will be modified by both applied grid voltages. The power stage operates either of the two solenoids 48 and 49 of the servo unit relays 50 and 51, and the servo unit 15 in turn acts on closing of either of the contacts 52 and 53. Inasmuch as the power stage 17 serves merely to actuate either of the relays 50 and 51, depending on the polarity of the voltages applied through paths 18, linearity of characteristic is not important. In view of the high voltage impressed on the grids of the tube 17, improved response is obtained by utilizing in the grid leads 18 resistors such as those marketed under the trade names "Varistor" or "Thyrite" and the resistance of which varies with the voltage, so as to produce a high static resistance and low dynamic resistance. In this way the zero signal voltage applied to the grids of the power stage 17 is reduced to a value such that the grids may operate with negative bias without employing excessive cathode resistance and so introducing degeneration and reducing power output.

Attitude servomotor 15 serves to rotate the shaft 30 in either direction, depending on signal polarity applied to grid 34 and performs two functions. The primary action of shaft 30 is to change the elevator adjustment of the aircraft as, for example, by the following means: The servo unit moves the rod 14, which in turn affects the mechanism within the gyroscope housing 13. This mechanism, old in itself, forms no part of the present invention and accordingly is not shown in the drawing. The gyro unit, as by means of a brush and contact sector operating about a neutral point, controls the elevator servo unit 11 through connections 12, the direction of action depending on direction of movement of the rod 14, and the aircraft response to the action of the elevator 62 returns the gyro mechanism, such as the brush and contact sector above referred to, to neutral position. In this way, the shaft 30, through link 14, gyro unit 13, connections 12, servo unit 11, servo unit pulley 60, and cable 10 and arms 61 controls the elevator 62 to produce the required response for changing altitude or resisting change of altitude.

The second effect of rotation of shaft 30 is to change the position of the brush of potentiometer 29 which together with capacitor 28 produces the anticipating action. The anticipating signal is applied to grid 44 through the condenser 28. The voltage pulse, which thus anticipates the change of aircraft altitude and continues as long as the brush of potentiometer 29 continues to move, is transitory and decays with a time constant, determined by the capacity-resistance characteristics of the circuit. These characteristics are selected so as to match the delay of the aircraft.

Hunting and overshooting are thus prevented since anticipation of the motion of the aircraft is simulated by the action of the servo shaft 30.

The elements 56, 57, 58, 59, 63, 67 and 68 have been added to take care of situations in which the servo unit 15 is of a slow acting type with large overrun. In such cases the closing of either of the relays 50, 51 applies a transitory anticipation voltage which acts in the same manner as would a fast servo unit in providing a signal through 30, 29 and 28, this signal being impressed on either grid of tube 17 depending on which of the relays 50, 51 is operated. By using these elements, fluttering of the control surfaces is prevented. If the servomotor 15 is fast and stops with small overrun then the elements 56, 57, 58, 59, 63, 67 and 68 are not required.

A source of potential 55 is connected in series with a voltage divider 58. One terminal of the source of voltage and one terminal of the voltage divider are connected to ground. An adjustable contact on the voltage divider 58 is connected to one of the contacts of each pair of contacts arranged to be closed by the armatures 56 and 57 of the relays 50 and 51. Whenever one of the relays is operated a circuit is completed from the adjustable contact of the voltage divider 58 to the resistor 63 or the resistor 67 depending upon which relay has operated. If the relay 51 is operated a portion of the voltage drop across the voltage divider 58 is applied to the juncture between the resistors 66 and 67. The resistor 67 is by-passed by the capacitor 68. One terminal of the resistor and one terminal of the capacitor are connected to ground. The application of potential to the juncture between the resistors 66 and 67 therefore will cause current to flow through the resistor 67 so that a voltage is developed thereacross. A voltage developed across the resistor 67 of course changes the potential applied to the grid of the vacuum tube 17. The resistor 67, the battery 55, and the voltage divider 58 constitute means for providing an anticipatory signal so that a slow servomotor does not have the big overrun it would have in the absence of such an anticipatory signal. The resistance alone, such as 67, would cause the relay contacts to chatter at a comparatively high frequency, accompanied with sparking. The condenser 68 is placed across the resistor 67 and the value of the capacity is such as to give a time constant of this circuit to produce the least sparking. This result is achieved due to the fact that the condenser will hold the voltage at the grid for a fraction of time after the relay opens. In this way the relay acts more positively for longer intervals, both in opening and in closing, thus eliminating chattering and sparking of the relay. In this connection it is to be noted that the values of the resistance 67 and by-pass condenser 68, and the resistance 63 and by-pass condenser 59 will vary as a function of the speed of the servomotor. If we have a fast stopping servomotor, the arrangement is not necessary.

In Figure 2 the specific relay system 50, 51 and servo unit 15, and also the automatic pilot consisting of parts 14, 13, 12, 11, 60, 10, 61 and 62 have been used for control purposes. Other servo means such as the magnetic clutch type and other automatic pilots may be used with appropriate changes in connections. While the invention has been described with relation to a specific electrical circuit, it will be apparent that other electrical or mechanical elements having the desired action and inter-relationship may be substituted without departing from the invention in its broader aspects.

The constant $k$, above referred to, and which determines the relative weight of altitude difference and vertical velocity in affecting the composite signal, is determined by the characteristics of the circuit applying signal voltage to grid 44. The proportion of the vertical velocity signal may be increased, for example, by increased amplification in amplifier 23, and may thus be determined in any convenient manner in accordance with well known principles, by varying the electrical characteristics of the circuit elements.

Still neglecting the effect of the damper rheostat 38, it will be clear that adjustment of the controller potentiometer 1 will control the altitude to be maintained and will also regulate the passage from one altitude to another. Assuming the aircraft in level flight at altitude $h_0$, corresponding to a given adjustment of the controller, a resetting to a new altitude $h_1$ will produce an altitude deviation signal and, in turn, a vertical velocity signal, so that the aircraft will maintain flight according to Equation 1, discussed above, and also in accordance with Equations 2 and 3, in which the time $t$ is to be taken as zero at the time of adjustment. As will now be clear, controller 1 may be set for change of altitude with the result that controlled flight from one set altitude to another is produced, the new altitude is approached asymptotically and without overrun and the new altitude, once the inactive zone is reached, is maintained.

With a given time constant $k$, however, which is suitable for optimum maintenance of level flight and relatively small change of altitude level with desired rate of climb or glide, it may be found that too high a vertical velocity is produced when adjustment for a large change of altitude is made. This situation may be remedied by the pilot through adjusting the controller 1 in several steps, to intermediate altitude levels, during the course of a large altitude change. It is preferred, however, to provide for large altitude changes with a single adjustment and for this purpose the damper 3 is provided.

Where the damper 3 is utilized, the damping effect may be controlled through setting rheostat 38, the condenser 37 opposing change in voltage applied to the cathode follower half of tube 36, so that the applied voltage and hence the voltage developed across cathode resistor 32 will take the form $$H = h_0 + (h_1 - h_0)(1 - e^{t/c})$$

gradually changing from the value $h_0$ to the value $h_1$, according to an exponential law, with a time constant $c$, determined by the setting of rheostat 38 and capacity of condenser 37. Since the voltage H itself varies, and the device responds, in the embodiment illustrated, to the voltage difference $(H-h)$ and to the rate of change thereof, a fictitious velocity signal component $$k \frac{dH}{dt}$$

is supplied to the balancer. In consequence thereof the aircraft would tend, if response were instantaneous and practical limitations of the electric circuits and aircraft control surfaces were ignored, to maintain flight according to the equation:

$$H - h - k\left(\frac{dh}{dt} - \frac{dH}{dt}\right) = 0 \qquad (4)$$

integrating which gives the altitude equation $$h_1 - h = (h_1 - h_0) e^{-t/c} \qquad (5)$$

and the vertical velocity equation $$\frac{dh}{dt} = \frac{(h_1 - h_0) e^{-t/c}}{c} \qquad (6)$$

Such a law of flight is, however, predicated on the assumption that the control system operates continuously, instead of in steps, corresponding to signal changes of magnitude sufficient to be outside the inactive zone, and on the further assumption that the response of the aircraft is continuous and immediate so that the altitude difference $H-h$ is always infinitesimal. Neither of these conditions is realized in actual flight, but the flight will be approximately exponential, and the aircraft will tend to maintain a flight path according to Equation 4 in the same manner as a level flight path is maintained according to Equation 1. Other laws of change of altitude setting may be employed, as a substitute for the specific damper disclosed without departing from the invention, as, for example, a change at constant rate, such as produced by a small motor, or a step by step change. In any event a law of flight determined by the manner of changing adjustment will be produced and the passage will be controlled accordingly. The specific law of change of adjustment adopted depends, of course, upon the conditions which it is desired to control and by utilizing change of altitude setting according to a law involving time, altitude or any other desired factors, vertical velocity may be controlled as a suitable function of such factors. Where desired the constant $k$ may itself be adjusted, as for example by a variable tap for connection 22 on resistor 76, but this is ordinarily unnecessary and the damper method of control is preferred.

For the purpose of simplifying the explanation of the operation of the system, the foregoing explanation was predicated on the assumption that the automatic altitude control device at all times was in condition to control the attitude of the aircraft. It, of course, will be understood that as is customary, automatic equipment of this type as well as other automatically controlled equipment is generally provided with a control switch for rendering the automatic device operative or inoperative by the pilot. One manner of rendering the circuit shown in Figure 2 inoperative is to insert a suitable switch in the conductors 16 between the vacuum tube 17 and the relay coils 50 and 51. When this switch is open, the relay coils cannot be operated by the electronic discharge devices and the aircraft must then be controlled by the pilot.

Where the automatic control device is provided with a switch for the selective operation of the device, it will be appreciated that at times the system and device may be placed into operation when there is a relatively great difference between the altitude of the aircraft and the predetermined selected altitude. Under such conditions the closing of the selector switch will produce the operation about to be described. It will first be assumed that the craft is flying at a level attitude so that the contact arm or brush of the potentiometer 29 is substantially at the center position. When the switch is thrown to engage the automatic altitude control, a considerable distance above or below the predetermined altitude will cause the high voltage to be applied to the grids 33 and 34 of the vacuum tubes 23 and 19 respectively. This high voltage has the effect of blocking operation of the velocity responsive vacuum tube portion 23 and also the right half portion of the vacuum tube 19. Thus at the time that the automatic altitude control device begins its operation, no velocity indication will be supplied in the form of a voltage normally transmitted through the condenser 21 to the grid 44 of the left half of the vacuum tube 19. The blocking of the grid 34 of the right half of the vacuum tube 19, however, which is the self-bias voltage appearing across the resistor 41 changes the operating condition of the left half of the vacuum tube 19 which will through vacuum tube 17 bring about energization of the servomotor. The servomotor 15 will move its shaft 30 to move the contact over the potentiometer 29. The voltage applied to the grid 44 by this action of the potentiometer brush will tend to modify the action of the vacuum tube 19 so as to halt operation of the servomotor. The resultant speed at which the servomotor operates will be determined by the voltage produced at the grid 44. The voltage on the grid 44 will eventually bring about a change of the voltage of the anode 45 until its voltage is approximately the same as the voltage appearing at the plate 46 at which time the servomotor 15 and the shaft 30 will have gained an equilibrium speed and will continue to introduce attitude changes at the same rate until either the aircraft reaches an altitude at which the velocity responsive tube 23 is no longer blocked or the shaft 30 reaches the limit of its operation. By proper selection of the components of the circuit, it can be determined at which voltage the right half of the vacuum tube 19 will become blocked. This can be determined by proper choice of the values of the resistors 74, 75 and 41. In this manner the speed of the shaft 30 and the speed of the servomotor 15 may be regulated or predetermined so as to operate at a slow or desired gradual rate. From the foregoing description of the operation where the device is placed into operative condition at a time where there is a considerable difference between the aircraft altitude and the desired pre-selected altitude, the system will have a slow or gradual response which is desired for safety reasons. When the device is to be rendered ineffective by operation of the selector switch, the response, however, is immediate and the craft is at once subject to the control of the pilot.

What is claimed is:

1. In an altitude control system for aircraft having means for measuring and changing altitude with the aid of an altimeter and automatic pilot, and in combination, a circuit containing an altitude sensitive element, a vertical velocity sensitive element, a mixer for said two elements, a means of presetting altitude, a balancer to compare preset and actual altitude, an anticipating element allowing for the time lag in said aircraft in responding to change of attitude, an adjustable damping element for introducing controllable rates of ascent or descent, connections between all said elements and a power circuit operable according to the conjoint effect of all said elements and means for operating automatic pilot servo units from the power circuit to control the flight of the aircraft.

2. In an altitude control system for aircraft having means for measuring and changing altitude with the aid of an altimeter and automatic pilot, and in combination, a circuit containing a controller to adjust preset altitude, an adjustable damper to control rates of ascent or descent, a balancer to compare preset and actual altitude, an amplifier to amplify the balancer signal, a differentiator to take the time derivative of the amplified balancer signal, a mixer to combine said balancer signal and said derivative of the amplified balancer signal, an anticipator to compensate for aircraft lag in responding to change of attitude, means for combining the said derivative of the amplified balancer signal and anticipation signal, a power stage operable according to the conjoint effect of all said signals, an attitude servo unit and relay means for operating the said servo unit from the output of said power stage, a vertical gyro and elevation servo controlled by the said attitude servo unit for operating the elevator of said aircraft to control the flight of the aircraft, whereby return to a preselected altitude lever is exponential in time, smooth and without hunt.

3. In an altitude control for aircraft, the combination comprising a pair of vacuum tubes connected in balanced circuit relation and having a common cathode resistor, a source of uni-directional control voltage of either sign and of variable magnitude connected to the input circuit of one of said tubes, an auxiliary tube connected to be energized in accordance with said uni-directional signal, and a coupling capacitor interconnecting the output of said auxiliary tube with the input of the other of said pair of tubes.

4. In an altitude control for aircraft, the combination comprising means responsive to the altitude of the aircraft for producing a uni-directional signal voltage, a source of uni-directional voltage, means for producing from said source a signal voltage corresponding to a predetermined selected altitude, a pair of vacuum tubes for controlling the attitude of the aircraft, means for comparing said signals, means responsive to the difference between said signals for controlling the conductivities of said vacuum tubes, and means responsive to the change between said signals as a function of time for modifying the conductivities of said vacuum tubes.

5. The combination comprising a pair of vacuum tubes connected in balanced circuit relation and having a common cathode resistor, a source of uni-directional control signal of either sign and of variable magnitude connected to the input circuit of one of said tubes, an auxiliary tube connected to be energized in accordance with said uni-directional signal, and a coupling capacitor interconnecting the output of said auxiliary tube with the input circuit of said other of said pair of tubes.

6. An aircraft altitude control including in combination altimeter means for producing a uni-directional voltage having a magnitude proportional to the altitude of said aircraft, means for obtaining a predetermined voltage corresponding in magnitude to a selected set altitude, means for opposing said voltages to obtain a balancer signal proportional in amplitude to the difference between the actual altitude and the desired altitude and of a direction depending upon the direction of error in actual altitude from the desired altitude, means for generating a control signal having a rate component from said balancer signal as a function of the rate of change in altitude and means responsive to said control signal for operating a control surface of the aircraft in a direction to bring the aircraft to an altitude at which said control signal rate component approaches zero.

7. An aircraft altitude control as in claim 6 including means actuated as a function of the movement of the control surface for generating an anticipatory signal and means for reducing the amplitude of said control signal rate component by said anticipatory signal.

8. An aircraft altitude control as in claim 6 including means for feeding said balancer signal to said control signal to form an altitude component and means responsive to said control signal for operating a control surface of the aircraft to bring the aircraft to an altitude at which the balancer signal approaches zero.

9. An aircraft altitude control as in claim 6 in which said means for obtaining a predetermined voltage corresponding in magnitude to a selected set altitude includes a voltage source, a potentiometer, a thermionic tube having a cathode, a resistor in the cathode circuit of said tube, the voltage across said resistor being the desired predetermined voltage 10. An aircraft altitude control as in claim 6 in which said means for generating a control signal from said balancer signal having a rate component as a function of the rate of change in altitude includes a pair of thermionic tubes, means for connecting the balancer signal to the input circuit of one of said tubes and a coupling capacitor interconnecting the output signal of said first thermionic tube with the input circuit of the other of said thermionic tubes, the output circuit of said second thermionic tube carrying the rate component of the control signal.

11. An aircraft altitude control including in combination means for generating a balancer signal proportional in amplitude to the difference between the actual altitude of an aircraft and a desired altitude, means for generating a signal component from said balancer signal as a function of the rate of change in altitude, means for mixing said balancer signal and said rate component signal to form a control signal, and means responsive to said control signal for operating a control surface of an aircraft in a direction to bring the aircraft to an altitude at which said balancer signal approaches zero at a rate at which said rate component approaches zero.

12. An aircraft altitude control including in combination means for generating a balancer signal proportional in amplitude to the difference between the actual altitude of an aircraft and a desired altitude, means for generating a signal component from said balancer signal as a function of the rate of change in altitude, means for mixing said balancer signal and said rate component signal to form a control signal, means responsive to said control signal for operating a control surface of an aircraft in a direction to bring the aircraft to an altitude at which said balancer signal approaches zero at a rate at which said rate component approaches zero, means actuated as a function of the movement of the control surface for generating an anticipatory signal, and means for reducing the amplitude of said rate component signal by said anticipatory signal.

13. An aircraft altitude control as in claim 12 in which said means for generating an anticipatory signal includes a source of potential, a potentiometer and means for moving said potentiometer as a function of movement of said control surface.

ROBERT HOFSTADTER.

REFERENCES CITED

The following references are of record in the file of this patent:

UNITED STATES PATENTS

| Number | Name | Date |
| --- | --- | --- |
| 1,545,373 | Vickers | July 7, 1925 |
| 1,997,412 | Fischel | Apr. 9, 1935 |
| 2,159,142 | Fischer | May 23, 1939 |
| 2,233,415 | Hull | Mar. 4, 1941 |
| 2,257,203 | Thacker | Sept. 30, 1941 |
| 2,311,642 | Crane et al. | Feb. 23, 1943 |
| 2,315,501 | Crane et al. | Apr. 6, 1943 |
| 2,415,429 | Kellogg et al. | Feb. 11, 1947 |
| 2,423,336 | Moseley | July 11, 1947 |

Certificate of Correction

Patent No. 2,507,304                      May 9, 1950

ROBERT HOFSTADTER

It is hereby certified that error appears in the printed specification of the above numbered patent requiring correction as follows:

Column 12, line 32, for the word "lever" read *level*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*